United States Patent
Nishida et al.

(10) Patent No.: US 7,526,569 B2
(45) Date of Patent: Apr. 28, 2009

(54) ROUTER AND ADDRESS IDENTIFICATION INFORMATION MANAGEMENT SERVER

(75) Inventors: Katsutoshi Nishida, Tokyo (JP); Takatoshi Okagawa, Tokyo (JP); Manhee Jo, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 821 days.

(21) Appl. No.: 10/832,277

(22) Filed: Apr. 27, 2004

(65) Prior Publication Data

US 2005/0010686 A1 Jan. 13, 2005

(30) Foreign Application Priority Data

May 1, 2003 (JP) ............... 2003-126601

(51) Int. Cl.
*G06F 15/16* (2006.01)
(52) U.S. Cl. .............. 709/239; 709/224; 709/238; 709/240; 709/245; 370/389
(58) Field of Classification Search .............. 709/224, 709/238, 239, 240, 245; 370/389
See application file for complete search history.

(56) References Cited

U.S. PATENT DOCUMENTS

| | | | | |
|---|---|---|---|---|
| 5,835,720 | A * | 11/1998 | Nelson et al. ............... | 709/224 |
| 6,457,061 | B1 * | 9/2002 | Bal et al. .................... | 709/245 |
| 6,757,281 | B1 * | 6/2004 | Irish ............................ | 370/389 |
| 6,925,503 | B2 * | 8/2005 | Davis et al. ................. | 709/238 |
| 2003/0236913 | A1 * | 12/2003 | Hoban et al. ................ | 709/238 |

FOREIGN PATENT DOCUMENTS

JP 2003-018185 1/2003

OTHER PUBLICATIONS

Egevang et al., "The IP Network Address Translator (NAT)," RFC 1631, May 1994.
Srisuresh et al., "IP Network Address Translator (NAT) Terminology and Considerations," RFC 2663, Aug. 1999.
Jo Manhee, et al., Addresses interchange procedure in mobility management architecture for IP-based IMT network platform (IP$^2$), Telecommunications, 10th International Conference, vol. 1, pp. 118-123, Feb. 23, 2003, Piscataway, NJ, USA, XP010637794.

(Continued)

*Primary Examiner*—Jinsong Hu
(74) *Attorney, Agent, or Firm*—Crowell & Moring LLP

(57) ABSTRACT

The problems of an additional load to an AR having the function of transferring a packet, a BR functioning as a border relay device, and an address management server, a packet loss due to an unnecessary inquiry to the management server, an increasing delay of a packet transfer, etc. can be reduced. According to the address identification information for identification of the type of an address, routers determine to which type the address assigned to a given packet belongs, a terminal identification address for identification of a source terminal and a destination terminal, a packet transfer address for transfer of the packet to another router, or an address requiring no address conversion. Thus, an address conversion network connected to an external IP network can be realized, an increased load by an inquiry about an erroneous address, etc. and a packet loss and delay due to an unnecessary inquiry can be reduced.

5 Claims, 10 Drawing Sheets

OTHER PUBLICATIONS

European Search Report.

Takatoshi Okada, et al., "IP Packet Routing Mechanism in IP$^2$", The Institute of Electronics, Information and Communication Engineers (IEICE) Technical Research Report, IN2002-123, vol. 102, No. 445, pp. 39-44 (9 total pages) (with partial English translation, 4 pages), Nov. 8, 2002.

Japanese Office Action with English translation.

* cited by examiner

FIG. 8

| NETWORK PREFIX INFORMATION | ADDRESS ASSIGNMENT RULE INFORMATION ||  OPTION FIELD |
|---|---|---|---|
| | DETERMINATION BIT | TERMINAL IDENTIFICATION ADDRESS DETERMINATION BIT VALUE | |
| A | 33 | 0 | |
| B | 41 | 1 | |
| C | 33 | 1 | |
| D | 49 | 0 | |
| ⋮ | ⋮ | ⋮ | |

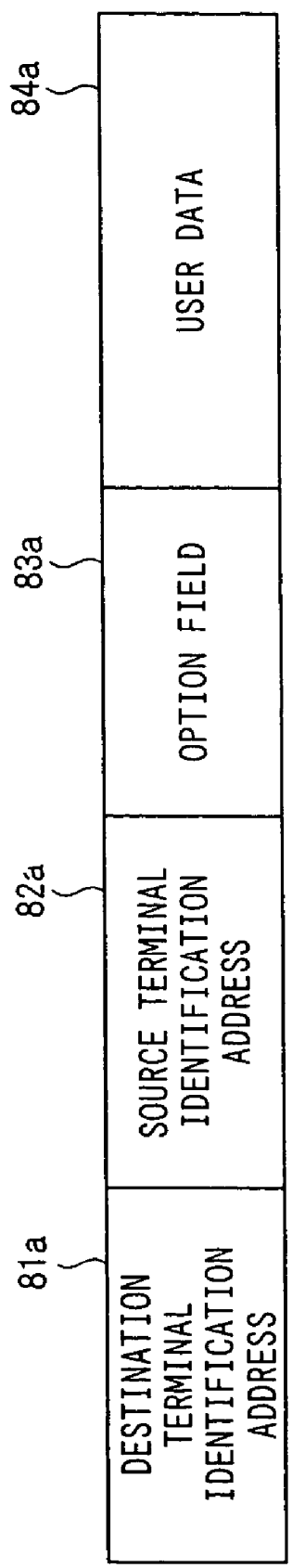
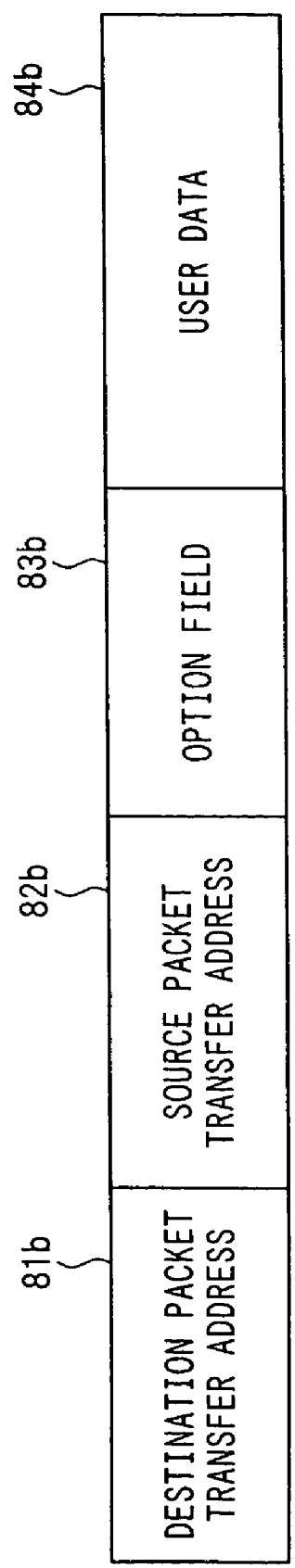

ROUTER AND ADDRESS IDENTIFICATION INFORMATION MANAGEMENT SERVER

BACKGROUND OF THE INVENTION

1. Field of the Invention

The present invention relates to a router and an address identification information management server, and more specifically to an access router (hereinafter referred to as an AR) for relaying a received packet, a border router (hereinafter referred to as a BR) for functioning as a border relay device among networks, and a address identification information management server for use with them.

2. Description of the Related Art

As a conventional technology, the network address translator (NAT) is described in Non-patent Document 1 as having the function of rewriting a source address of a packet in a router having the function of transferring a packet. Additionally, as a derivative technology, Twice NAT is described in Non-patent Document 2 for rewriting not only the source address of a packet but also the destination address of the packet.

The Twice NAT rewrites not only the source address of a packet in the NAT but also the destination address of a packet according to the address conversion table set in a cache table in advance when there arises a conflict between an IP address used in a private network and an IP address used in an external network. However, in the above-mentioned conventional technologies, the address conversion is performed according to the address conversion table statically stored in the router in advance. Therefore, an address conversion table cannot be dynamically generated or an address cannot be rewritten by referring to the table, and addresses before and after conversion cannot be discriminated corresponding to dynamic address conversion, thereby failing in realizing an address conversion network.

Patent Document 1 has disclosed the technology of discriminating an IPv6 (Internet Protocol version 6) address from an IPv4 (Internet Protocol version 4) address based on the address format.

(Patent Document 1)

Japanese Patent Lad-Open No. 2003-18185 (Paragraph 0028-0071)

(Non-Patent Document 1)

Egevang, K. and P. Francis, "The IP Network Address Translator (NAT)", RFC 1631, May 1994.

(Non-Patent Document 2)

Srisuresh, P. and M. Holdrege, "IP Network Address Translator (NAT) Terminology and Considerations", RFC 2663, August 1999.

In the conventional study of realizing an address conversion network, when any apparatus in an address conversion network refers to the address of a packet, there is no method of correctly determining whether the address is a terminal identification address for use in an address conversion network, an address of packet transfer, or an address of an IP communications terminal in an external IP network. Accordingly, there have been the problems that the load of the AR having the function of transferring a packet, the BR functioning as a border relay device, and the address management server has been increasing due to unnecessary inquiries about addresses, there occurs a packet loss, an increasing delay of a packet transfer, etc, by an unnecessary inquiry to the address management server.

SUMMARY OF THE INVENTION

The present invention has been developed and aims at providing a router and an address identification information management server capable of solving the following two problems causing the above-mentioned problems.

(First Problem)

In the network using a terminal identification address and a packet transfer address (hereinafter referred to as an address conversion network), the AR and the BR refer to the address conversion table storing combination information about a terminal identification address and a packet transfer address stored by the AR and the BR to convert the address of a packet transmitted from a source terminal. If there are a plurality of address conversion policies in which the terminal in the address conversion network is not only of a communication type communicating with another terminal in the address conversion network but also of a communication type communicating with an IP communications terminal in an external IP network in which address conversion is not performed (interconnection with an external IP network), a system of converting only the destination address of a packet in an address conversion network and a system of converting both destination address and source address of a packet are used, and a source address is not converted if the interconnection with an external IP network is performed, there is the first problem to determine which address is the destination or source address of a packet, the terminal identification address used in the address conversion network or a packet transfer address, or the address of an existing IP communications terminal in the external IP network.

The technology described in Patent Document 1 only discriminates the addresses (IPv4 address and IPv6 address) represented in different formats, but cannot identify the addresses represented in the same format.

(Second Problem)

When the above-mentioned first problem is solved, an address is dynamically assigned to embody the address conversion in the address conversion network. In this connection, the specifications of Japanese Patent Application No. 2002-276196 discloses the method of providing an address management server for managing address conversion information in the network as a method of centrally managing the assigned address information. However, when there are a plurality of address conversion networks, each network assigns an terminal identification address and a packet transfer address according to an independent rule, and a packet is transferred over the address conversion networks, the address type can be misdetermined by an access router, which is the second problem.

The router of the present invention relays a received packet, and includes: determination means for determining, according to address identification information for identification of an address type, to which address represented in a same format the received address added to the packet belongs: a terminal identification address for identification of a source terminal performing communications through the router and a destination terminal; or a packet transfer address for transfer of the packet to another router; and an address requiring no address conversion.

If any address represented in the same format is added to a packet, the type can be identified.

In the router, before transmitting a request to obtain address conversion information, it is determined whether or not it is practically necessary to convert a target address, and the address conversion is performed only on a target address which is actually to be converted. Therefore, it is not necessary to issue an inquiry about an address not required to be converted. As a result, network congestion or an overload of an address management server and an access router can be prevented.

In the router of the present invention, the address on which no address conversion is required is at least one of the address assigned in an external network without performing address conversion and the address which is determined by a network policy that it is not necessary to be converted. The address assigned in an external network without performing address conversion and the address which is determined by a network policy that it is not necessary to be converted can be determined that they are not required to be converted.

The router of the present invention further includes an address identification information table for storing the address identification information, and the address identification information stored in the address identification information table is externally updated. By providing the table and updating the stored contents, any change in the address identification information can be correctly reflected.

The router of the present invention further includes address conversion means for converting an address added to the packet depending on a determination result by the determination means. Thus, an address can be changed only when it is necessary.

In the router of the present invention, the address conversion means converts the terminal identification address and the packet transfer address according to the address conversion information indicating a combination of the terminal identification address and the packet transfer address. Thus, a packet received from a terminal can be transferred to another router.

In the router of the present invention, the address identification information includes network prefix information indicating a network prefix assigned by an Internet administrator; the determination means determines according to the network prefix information whether an address added to a packet is one of a terminal identification address and a packet transfer address to be added to a packet used in an address conversion network in which a terminal identification address and a packet transfer address are used, or an IP address for use in an external IP network. By determining according to the network prefix information, it can be determined whether or not the destination address or the source address of the packet is at least one of a terminal identification address and a packet transfer address, or an IP address used in an external IP network.

In the router of the present invention, the address identification information includes address assignment rule information used when the address is assigned, and the determination means determines whether the address added to the packet according to the address assignment rule information and used in the address conversion network is a terminal identification address or a packet transfer address. Thus, a terminal identification address and a packet transfer address is discriminated according to the address assignment rule information, thereby performing address conversion.

The router of the present invention further includes an address conversion information storage table for storing address identification information, wherein the address conversion information stored in the address conversion information storage table is externally updated. By providing the table and updating the stored contents, any change in the address identification information can be correctly reflected.

In the router of the present invention, the address added to the packet is an IP address in the format in accordance with IPv6 (Internet Protocol version 6). Although an IP address in the format in accordance with IPv6 is added to a packet, the identification can be performed.

The address identification information management server of the present invention manages address identification information for identification of an address type in a first network in which a first apparatus to which the server is applied is accommodated, and includes: notification means for notifying a second apparatus in a second network of address identification information managed by the first apparatus at least one of cases when the first network is connected to the second network and when contents of the address identification information managed by the first apparatus are updated; and reception means for receiving the address identification information notified by the second apparatus in the second network, wherein the address identification information managed by the first apparatus is updated depending on contents received by the reception means. By issuing the information about the update of the address identification information, the contents of address identification information can match with those of another network.

BRIEF DESCRIPTION OF THE DRAWINGS

FIG. 8 shows the contents of the address identification information table stored in the prefix management server, the access router, and the border router;

FIG. 10A shows the format of the packet communicated between the terminal and the access router, and FIG. 10B shows the format of the packet communicated between the access routers.

DETAILED DESCRIPTION OF THE PREFERRED EMBODIMENTS

Figure 1:
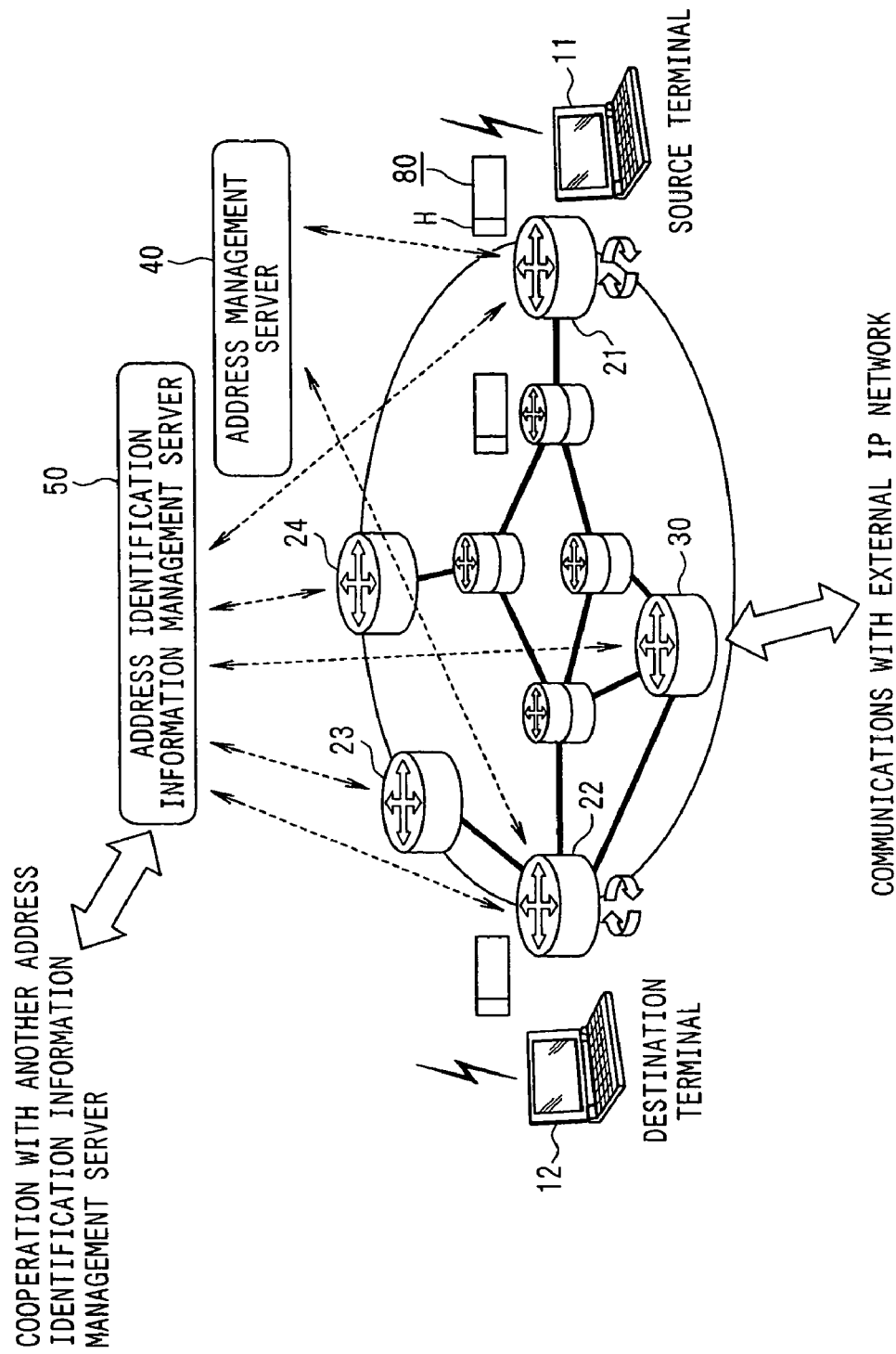
FIG. 1 shows the outline of the configuration of the network configured using the router according to the present invention.

The embodiments of the present invention are described below by referring to the attached drawings. In the explanation below, the same reference numerals are assigned to the identical components.

FIG. 1 shows an example of the configuration of the communications system including the router according to the present invention and the address identification information management server. In FIG. 1, the communications system according to the present embodiment comprises movable terminals 11 and 12, ARs 21, 22, 23, and 24, and a BR 30. It also comprises an address management server 40 for managing a terminal identification address and a packet transfer address, and an address identification information management server 50 for managing network prefix information and address assignment rule information.

The terminals 11 and 12 can be a PDA (personal digital assistant), a mobile telephone, a notebook type computer, etc. which are portable and can communicate with a destination terminal by wireless. The terminals 11 and 12 are assumed to have the function of transferring a packet using only a terminal identifier if the communication partner is a terminal in an address conversion network. The terminals 11 and 12 are assumed to have the function of transferring a packet using the IP address of the communication partner as the destination when they communicate with a terminal in an external IP network.

ARs 21 to 24 are routers connected by a communications terminal over a wireless network. The internal configuration of the ARs 21 to 24 are described later in detail.

The BR 30 is a router for connecting an address conversion network to an external IP network. The BR 30 is arranged at the boundary between the address conversion network and the external IP network. The internal configuration of the BR 30 is also described later in detail.

Figure 2:
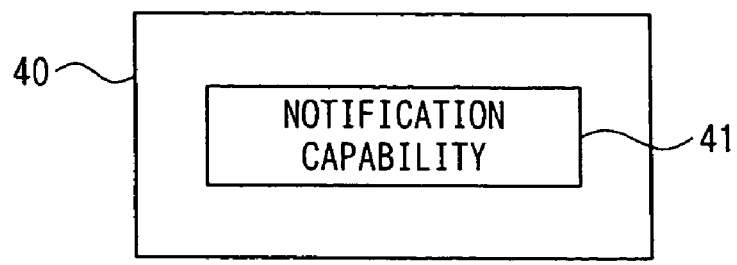
FIG. 2 is a block diagram showing the main function of the address management server shown in FIG. 1.

The address management server 40 manages a terminal identification address and a packet transfer address as shown in FIG. 2, and has the notification capability 41 of giving a notification of the combination of a terminal identification address and a packet transfer address in response to an inquiry from the AR and the BR.

Figure 3:
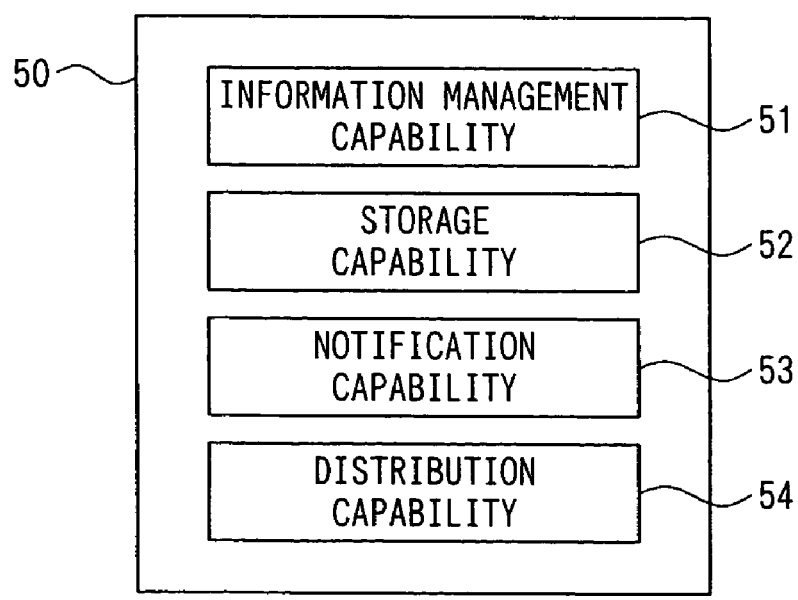
FIG. 3 is a block diagram showing the main function of the address identification information management server shown in FIG. 1.

The address identification information management server 50 is arranged in an address conversion network as shown in FIG. 3, and comprises: an information management capability 51 for managing network prefix information assigned to an address conversion network by an organization which manages an IP address, and address assignment rule information applied by an administrator of a network for assignment of a terminal identification address and a packet transfer address; a storage capability 52 for obtaining and storing network prefix information about another address conversion network and address assignment rule information about a terminal identification address and a packet transfer address; a notification capability 53 for announcing the information; and a distribution capability 54 for distributing network prefix information about all stored address conversion networks and address assignment rule information to all AR in the network. Thus, since information is announced from the address identification information management server 50 to another apparatus, and a notification is received from another apparatus, the contents of the address identification information stored in each apparatus can be made to match. Hereafter, obtaining matching contents is referred to as "synchronizing".

In the specifications of the present invention, address identification information can be described ad including network prefix information and address assignment rule information.

Back in FIG. 1, when a packet 80 transmitted from the source terminal 11 is input to the AR 21 in a network having the above-mentioned configuration, the address added to the packet 80 is converted as necessary. When the packet whose address has been converted is input to the AR 22 near the destination terminal, the address added to the packet is converted into the original address. The converting process is described later in detail.

It is common that an address is added to the header H of a packet. The address is represented in a format in accordance with, for example, IPv6. In the present invention, an address represented in the same format is identified.

Figure 4:
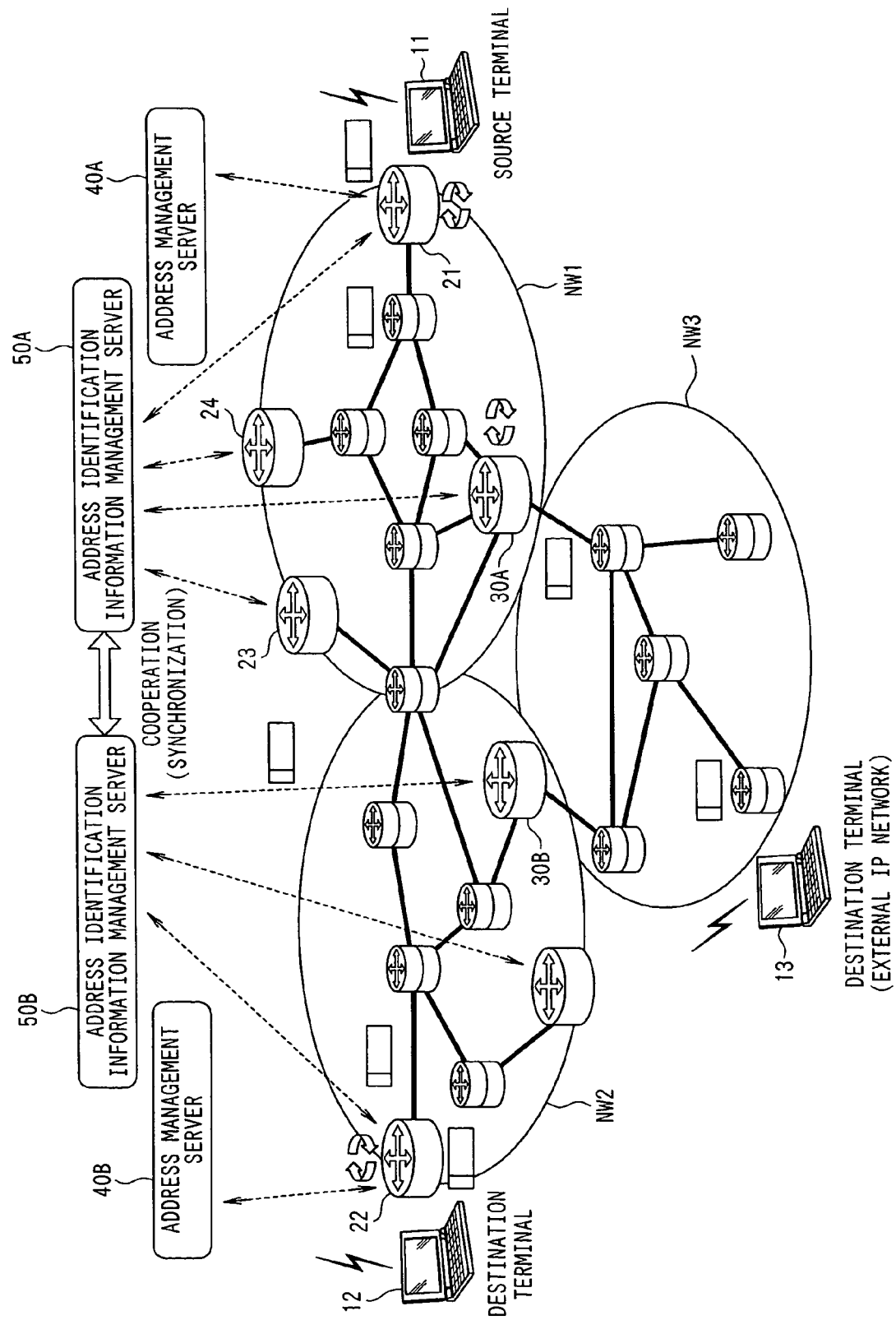
FIG. 4 shows the state of connection between a plurality of address conversion networks configured using the router according to the present invention and an external IP network, and the communications among them.

FIG. 4 shows the state of the terminal 11 in a network NW 1 to which the present invention is applied communicating with the terminal 12 in another network NW 2, and with an IP communications terminal 13 in an external IP network NW 3.

With the example of the network configuration, a plurality of address conversion networks NW1 and NW2 are connected with the external IP network NW 3 that does not perform address conversion. The network NW1 and the network NW3 are connected through a BR 30A, and the network NW 2 and the network NW 3 are connected through a BR 30B.

An address identification information management server 50A in the network NW 1 cooperates with an address identification information management server 50B in the network NW 2 so that the contents of the stored address identification information can be synchronized.

The address identification information management server in each network cooperates with each other, and notifies each other of address identification information and updates it when a new network is activated, when the address identification information about the assigning system, the identifying system, etc. of a terminal identification address and a packet transfer address in a network already operating as an address conversion network is changed, etc. When the address identification information about each address conversion network stored in the address identification information management server is updated, the server notifies all ARs and BRs in the network of the updated address identification information.

In the AR and BR, it is determined whether the destination address or the source address of a packet is a terminal identification address, a packet transfer address, or an IP address used in an external IP network according to the network prefix information in the address identification information stored in each AR and BR. When there are a plurality of address conversion policies in an address conversion network (for example, in an environment in which there are the system of converting only the destination address of a packet and the system of converting both destination address and source address of a packet), an address is identified whether it is a terminal identification address or a packet transfer address according to the address rule assignment information. It is determined whether or not address conversion is to be performed based on which address field of the packet the determination result and the determined address have been described (destination address or source address) and based on which path of the AR or BR the packet has been input.

Thus, the address conversion can be correctly performed in the communications between the terminals of different networks, thereby successfully communicating a packet.

Figure 5:
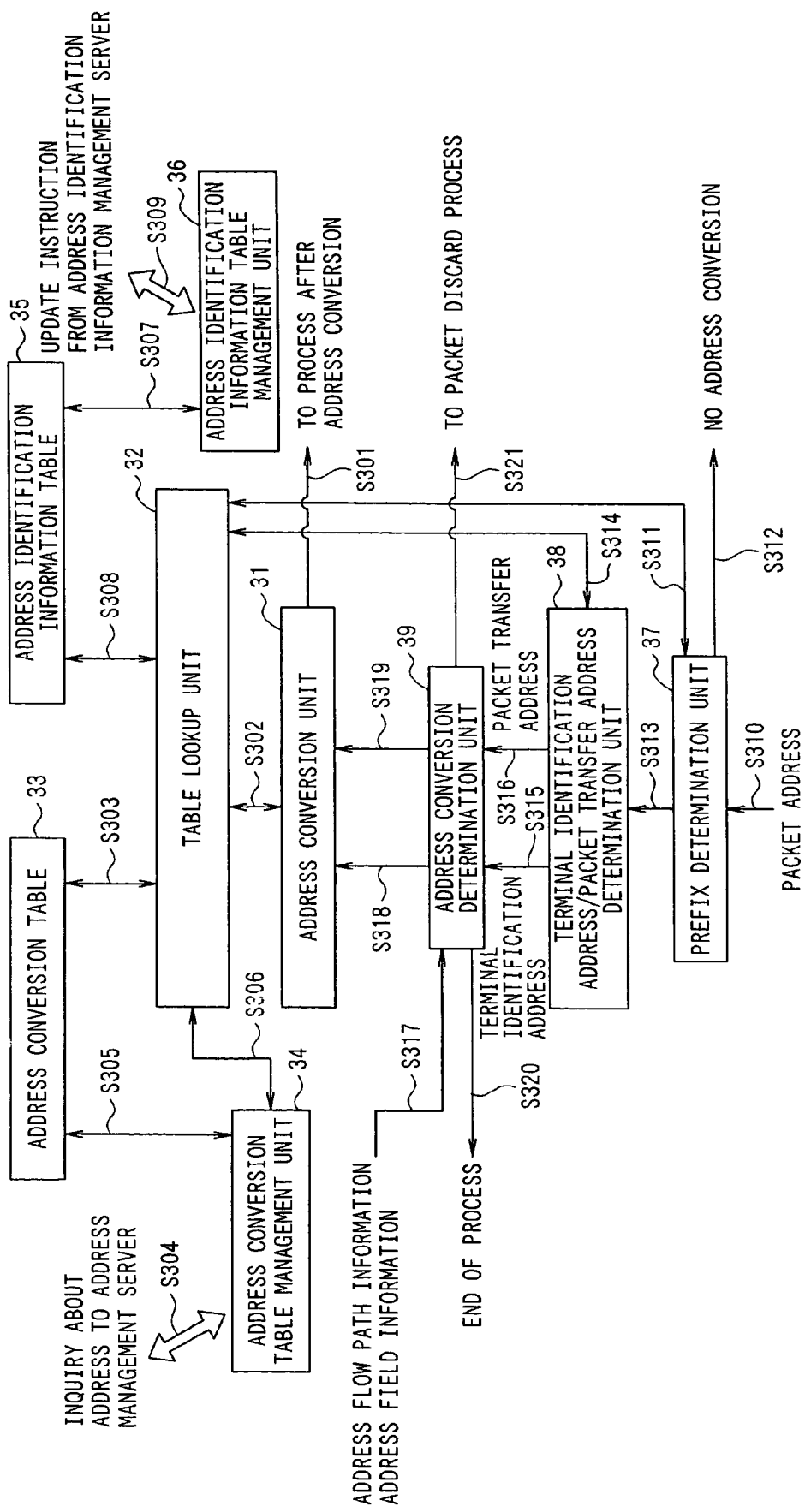
FIG. 5 is a block diagram showing the configuration for address identification an address conversion using the router according to the present invention.

FIG. 5 is a block diagram showing the configuration in which an address is identified and converted in an AR and BR which the address identification and the address conversion are performed. Described below is the configuration of an AR, and the BR has a similar configuration.

The AR is a router for connecting a communications terminal over a wireless network. The AR comprises: an address identification information table 35 used in determining a terminal identification address, a packet transfer address, or an IP address of an external IP network; a prefix determination unit 37 for identifying an address in an external IP network, or a terminal identification address/packet transfer address used in an address conversion network according to network prefix information of address identification information; a terminal identification address/packet transfer address determination unit 38 for identifying a terminal identification address or a packet transfer address according to assignment rule information about address identification information; an address conversion determination unit 39 for determining whether or not address conversion is to be performed on a target address according to address type information (terminal identification address or packet transfer address), input interface information about a packet whose address is described, and information about a source address field or a destination address field; an address identification information table management unit 36 for obtaining or updating an address identification information management table; a table lookup unit 32 for referring to an address conversion table; an address conversion unit 31 for performing packet address conversion based on a reply in response to the inquiry about address conversion information to the table lookup unit 32; an address conversion table management unit 34 for issuing an inquiry to an address management server about a packet transfer address and a terminal identification address using a corresponding terminal identification address or packet transfer address to obtain a combination of a packet transfer address and a terminal identification address required in communications with an internal network of a packet or with a communications terminal; and an address conversion table 33 for functioning as cache for storing information required in address conversion.

In FIG. 5, the address conversion processing function block, that is, the address conversion unit 31, the table lookup unit 32, the address conversion table 33, and the address conversion table management unit 34, are components provided by software or hardware in an existing router (AR and BR) having the function of converting an address.

The address conversion unit 31 performs a converting process on an input address. After the conversion in the converting process, control is passed to the next process (S301). The address conversion unit 31 refers to the address conversion table 33 and the address identification information table using the table lookup unit 32 (S302).

The address conversion table 33 stores combination information about a terminal identification address and a packet transfer address. Therefore, a terminal identification address and a packet transfer address can be converted into each other by referring to the address conversion table 33. When an entry in the address conversion table 33 is referred to, the table lookup unit 32 provided in an existing router and a NAT function router is used. That is, by referring to the table lookup unit 32, the terminal identification address and a packet transfer address in the address conversion table 33 is retrieved, and the reply is returned (S303).

The table lookup unit 32 is used when the address conversion table 33 and the address identification information table 35 described later are referred to. That is, when the contents of the address conversion tables 33 and the address identification information table 35 are retrieved and the reply is obtained, the contents of the table lookup unit 32 are referred to.

The address conversion table management unit 34 has the function of managing the address conversion table 33 provided in the same router. Practically, the address conversion table management unit 34 issues an inquiry about an address to the address management server, and changes the contents of the address conversion table 33 and the table lookup unit 32 depending on the contents (S304) of the returned reply (S305, S306).

In addition to the above-mentioned components, the access router also comprises the address identification information table 35, the address identification information table management unit 36, the prefix determination unit 37, the terminal identification address/packet transfer address determination unit 38, and the address conversion determination unit 39.

(Address Identification Information Table)

The address identification information table 35 stores address identification information used in an address type determining process described later by referring to FIG. 6. One entry of address identification information is configured By the network prefix information about the address conversion network, the address assignment rule information, and an option field.

Entries can be newly added or deleted in the address identification information table 35 by the address identification information table management unit 36. That is, the address identification information table management unit 36 changes the contents of the address identification information table 35 (S307).

When an entry in the address identification information table 35 is referred to, the table lookup unit 32 provided for an existing router and a NAT function router is used. That is, by referring to the table lookup unit 32, the address identification information about the address identification information table 35 is retrieved, and the reply is returned (S308).

(Address Identification Information Table Management Unit)

The address identification information table management unit 36 has the function of managing the address identification information table 35 provided in the same router. Practically, when an update instruction is received from the address identification information management server, the address identification information table management unit 36 updates the contents of the address identification information table 35 (S309). In this update of the contents, the address identification information management server cooperates with the address identification information table management unit provided in the router in each address conversion network, and obtains the synchronization among the address identification information tables.

The update of the contents of the address identification information table 35 can be performed in the following method. For example, a multicast address is set for use in a transfer to the address identification information management table so that a packet can be transferred to the multicast address when a new address conversion network is generated and a change occurs in the address identification information table by a change in the address identifying method.

(Prefix Determination Unit)

The prefix determination unit 37 receives an address of a packet (S310). Then, the prefix determination unit 37 determines the type of the destination or source address of the packet, that is, as a terminal identification address or a packet transfer address in an address conversion network, or an IP address of an IP communications terminal in an external IP network. When the determination is made, the network prefix information is referred to in the information in the address identification information table 35 stored in the AR or BR (S311).

When the prefix determination unit 37 reads data from the address identification information table 35, the table lookup unit 32 is used. That is, by referring to the table lookup unit 32, the network prefix information in the address identification information table 35 is retrieved, and the reply is returned (S308).

When the network prefix information is referred to, a matching operation is performed with the network prefix of the address. When a matching result is obtained as a result of the matching operation, it is determined that the address is a terminal identification address or a packet transfer address used in the address conversion network.

If the address is determined to be an address in an external IP network as a result of the determination, then no address conversion is performed, and the address converting process terminates (S312). On the other hand, if it is determined that the address is a terminal identification address or a packet transfer address for use in an address conversion network, then the address is passed to the terminal identification address/packet transfer address determination unit 38 (S313).

(Terminal Identification Address/Packet Transfer Address Determination Unit)

The terminal identification address/packet transfer address determination unit 38 determines the type of the received address, that is, as a terminal identification address or a packet transfer address as a result of the determination by the prefix determination unit 37. When the determination is made, the address assignment rule information is referred to in the information in the address identification information table 35 (S314).

When the address identification information is referred to by the terminal identification address/packet transfer address determination unit 38, the table lookup unit 32 is used. That is, by referring to the table lookup unit 32, the address assignment rule information in the address identification information table 35 is retrieved, and the reply is returned (S308).

The address assignment rule information comprises a determination bit for determination of the type of address, and a terminal identification address determination bit for determining which determination bit, "0" or "1", refers to a terminal identification address. Depending on the determination result according to the address assignment rule information, the terminal identification address/packet transfer address determination unit 38 passes control to the address conversion determination unit 39 after it determines the address as a terminal identification address or a packet transfer address (S315, S316).

When the prefix determination unit reads address identification information, it simultaneously reads address assignment rule information, and the earlier obtained address assignment rule information can be transmitted simultaneously when a target address is transmitted to the terminal identification address/packet transfer address unit.

(Address Conversion Determination Unit)

The address conversion determination unit 39 determines whether or not address conversion can be performed on a packet passed from the terminal identification address/packet transfer address determination unit 38. The determination is made based on the address flow path information and the address field information (S317).

The address flow path information indicates through which path of the AR or the BR the packet has been received. On the other hand, the address field information indicates in which field (destination address field or source address field) in the packet the address is described in the packet. However, when there are a plurality of address conversion policies in a network, it is determined by the address conversion determination unit 39 which address conversion policy is applied.

The address conversion determination unit 39 transmits a terminal identification address to be converted and a packet transfer address to be converted to the address conversion unit 31 (S318, S319). On the other hand, the subsequent process terminates for a terminal identification address on which no address conversion is required (S320). A terminal identification address on which no address conversion is required refers to an address which is determined by a network policy that it is not necessary to perform address conversion. When a packet transfer address flows through an unauthorized path, control is passed to a process of discarding the packet (S321).

The operation of the address conversion determination unit 39 is explained below by referring to FIGS. 6 and 7.

(Process by Address Conversion Determination Unit of AR)

Figure 6:
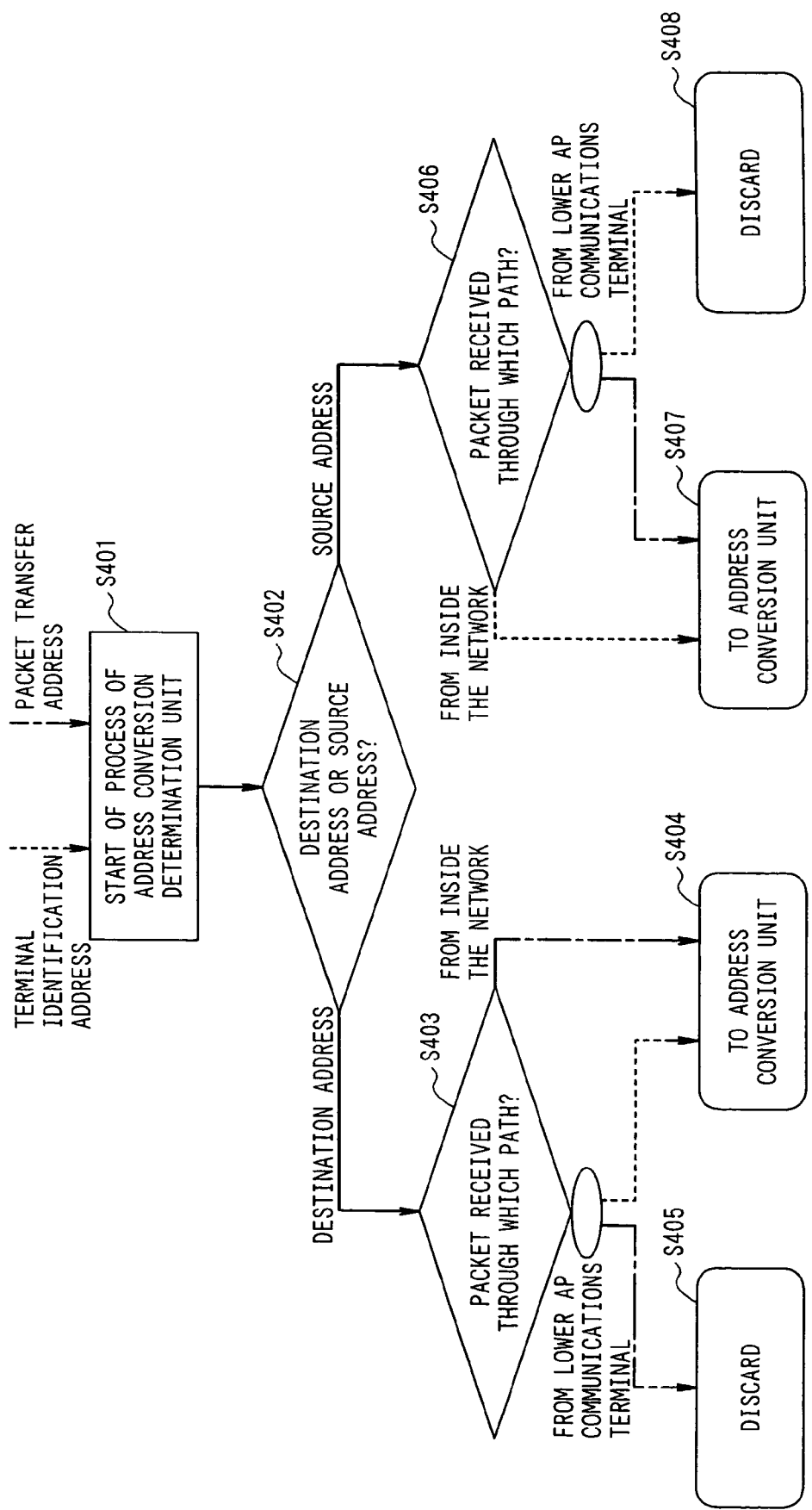
FIG. 6 is a flowchart showing the process of the address conversion determination unit when the present invention is applied to an access router.

FIG. 6 is a flowchart showing the converting process by the address conversion determination unit in the functions added to the AR to realize the present invention. In this example, a network in which a single address conversion policy is used (system of converting a source address and a destination address) is explained.

In FIG. 6, the flow of the process relating to a destination address is indicated by broken lines, the flow of the process relating to a source address is indicated by alternate long and short dashed lines, and the flow of the process common to both processes is indicated by solid lines.

In FIG. 6, when a terminal identification address is input, the process of the address conversion determination unit is started (step S401). First, it is determined whether an input address is a destination address or a source address (step S402).

When the input address is a destination address as a result of the determination in step S402, control is passed to the address conversion unit (step S402→S403→S404).

When the input address is a source address as a result of the determination in step S402, it is determined through which path the packet has been received (step S402→S406) When it is determined that the packet was received from inside the network as a result of the determination in step S406, control is passed to the address conversion unit (step S406→S407). When it is determined that the packet was received from a lower communications terminal in the AR as a result of the determination in step S406, the packet is discarded, and the subsequent processes are not performed (step S406→S408) because it is considered that the packet with the packet transfer address has been received from an unauthorized direction.

If a packet transfer address is input in FIG. 6, the process of the address conversion determination unit is started (step S401). First, it is determined whether the input address is a destination address or a source address (step S402).

If the input address is a destination address as a result of the determination in step S402, it is determined through which path the packet has been received (step S403). If it is determined that the packet was received from inside the network as a result of the determination in step S403, control is passed to the address conversion unit (step S403→S404) When it is determined that the packet was received from a lower communications terminal in the AR as a result of the determination in step S403, the packet is discarded, and the subsequent processes are not performed (step S403→S405) because it is considered that the packet with the packet transfer address has been received from an unauthorized direction.

When the input address is a source address as a result of the determination in step S402, control is passed to the address conversion unit (step S402→S406→S407)

In the above-mentioned process, the terminal identification address is not set and transferred as a destination address of the packet from inside the network to the AR or BR to perform address conversion in the AR or BR on the destination addresses (excluding an address in an external IP network) of all packets.

(Process by Address Conversion Determination Unit of BR)

Figure 7:
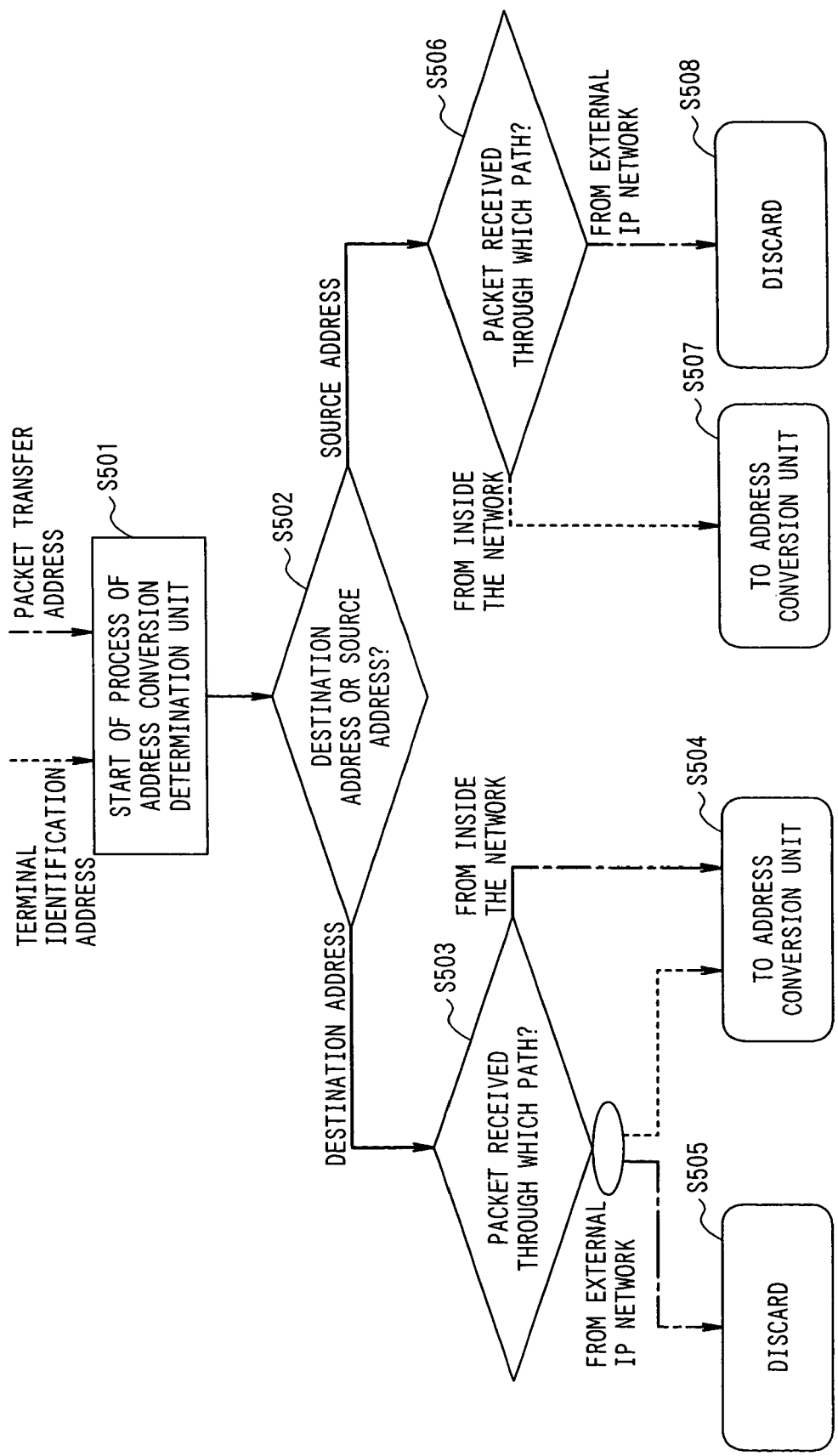
FIG. 7 is a flowchart showing the process of the address conversion determination unit when the present invention is applied to a border router.

FIG. 7 is a flowchart showing the converting process by the address conversion determination unit in the functions added to the BR to realize the present invention. In this example, a case in which a plurality of address conversion policies are not used (system of converting a source address and a destination address) is explained.

In FIG. 7, the flow of the process relating to a destination address is indicated by broken lines, the flow of the process relating to a source address is indicated by alternate long and short dashed lines, and the flow of the process common to both processes is indicated by solid lines.

In FIG. 7, when a terminal identification address is input, the process of the address conversion determination unit is started (step S501). First, it is determined whether an input address is a destination address or a source address (step S502).

When the input address is a destination address as a result of the determination in step S502, control is passed to the address conversion unit (step S502→S503→S504).

When the input address is a source address as a result of the determination in step S502, it is determined through which path the packet has been received (step S502→S506). When it is determined that the packet was received from inside the network as a result of the determination in step S506, control is passed to the address conversion unit (step S506→S507). When it is determined that the packet was received from an external IP network as a result of the determination in step S506, the packet is discarded, and the subsequent processes are not performed (step S506→S508) because it is considered that a packet is an unauthorized packet when a source address is a terminal identification address.

If a packet transfer address is input in FIG. 7, the process of the address conversion determination unit is started (step S501). First, it is determined whether the input address is a destination address or a source address (step S502).

If the input address is a destination address as a result of the determination in step S502, it is determined through which path the packet has been received (step S503).

If it is determined that the packet was received from inside the network as a result of the determination in step S503, control is passed to the address conversion unit (step S503→S504). When it is determined that the packet was received from an external IP network as a result of the determination in step S503, the packet is discarded, and the subsequent processes are not performed (step S503→S505) because it is considered that the packet with the packet transfer address has been received from an unauthorized direction.

When the input address is a source address as a result of the determination in step S502, the packet is discarded, and the subsequent process is not performed (step S502→S506→S508). This is because when the source address is a packet transfer address, it is considered that the packet is an unauthorized packet.

In the above-mentioned process, the terminal identification address is not set and transferred as a destination address of the packet from inside the network to the AR or BR to perform address conversion in the AR or BR on the destination addresses (excluding an address in an external IP network) of all packets.

(Storage Contents of Address Identification Information Table)

FIG. 8 shows an example of the contents of the information stored in the address identification information table of the prefix management server, the access router, and the border router.

In FIG. 8, the address identification information table stores network prefix information 61, address assignment rule information 62, and option field 65.

The network prefix information 61 is the information indicating the network prefix assigned by an Internet administrator to an address conversion network. The information is, for example, an address indicating the network prefix such as "3ffe:0501:1823::/48", etc. An Internet administrator is, for example, IANA (Internet assigned numbers authority), etc.

The address assignment rule information 62 is the information used in discriminating a terminal identification address or a packet transfer address.

The address assignment rule information comprises a determination bit 63 and a terminal identification address determination bit value 64. The determination bit 63 is a bit indicating the position in the address in the address determination bit used in determining an address type. The terminal identification address determination bit value 64 is a bit value used in determining which is the bit value, 0 or 1, indicating a terminal identification address.

The option field 65 is a field in which other information can be added when an address is identified.

In FIG. 8, when the network prefix information is "A", the determination bit is "33", and the terminal identification address determination bit value is "0". When the network prefix information is "B", the determination bit is "41", and the terminal identification address determination bit value is "1". When the network prefix information is "C", the determination bit is "33", and the terminal identification address determination bit value is "1". When the network prefix information is "D", the determination bit is "49", and the terminal identification address determination bit value is "0".

(Format of Address Identification Information Notification Message)

Figure 9:
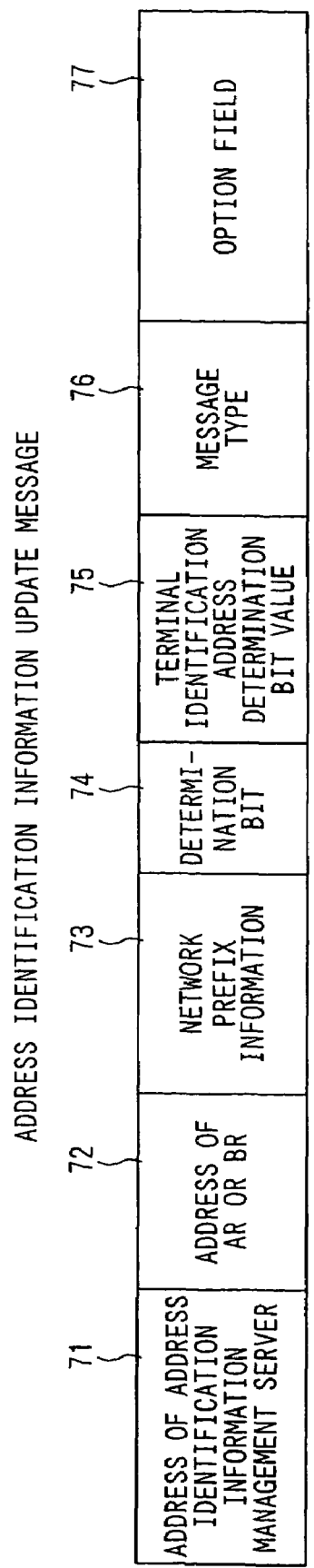
FIG. 9 shows the format of an address identification information notification message transmitted for notification from the address identification information management server to the AR and the BR.

FIG. 9 shows the format of an address identification information notification message. The address identification information notification message is a packet for use when the address identification information management server 50 (shown in FIG. 1) and the address identification information table management unit 36 (shown in FIG. 5) in the AR or the BR communicate information with each other.

The address identification information notification message shown in FIG. 9 comprises an address identification information management server 71, an address 72 of an AR or a BR, a message type 76, and an option field 77. In addition, as address identification information, network prefix information 73, a determination bit 74, and a terminal identification address determination bit value 75 are contained in the address identification information notification message.

The message type 76 is the information indicating the type of message about addition, deletion, update, etc.

The option field 77 is used when a large amount of address identification information has to be simultaneously updated. By using the option field 77, a plurality of messages can be transmitted as one message.

(Format of Packet)

The format of a packet transmitted and received between a terminal and a router, and between routers is explained below by referring to FIGS. 10A and 10B. Between a terminal and an access router, the format of a packet is as shown in FIG. 10A. That is, as shown in FIG. 10A, a packet comprises a destination terminal identification address 81a, a source terminal identification address 82a, an option field 83a, and a user data 84a.

Among the access routers, for example, in an address conversion network in which both a source address and a destination address are rewritten, the format of a packet is as shown in FIG. 10B. That is, as shown in FIG. 10B, a packet comprises a destination packet transfer address 81b, a source packet transfer address 82b, an option field 83b, and a user data 84b.

(Packet Format Converting Process)

Figure 11:
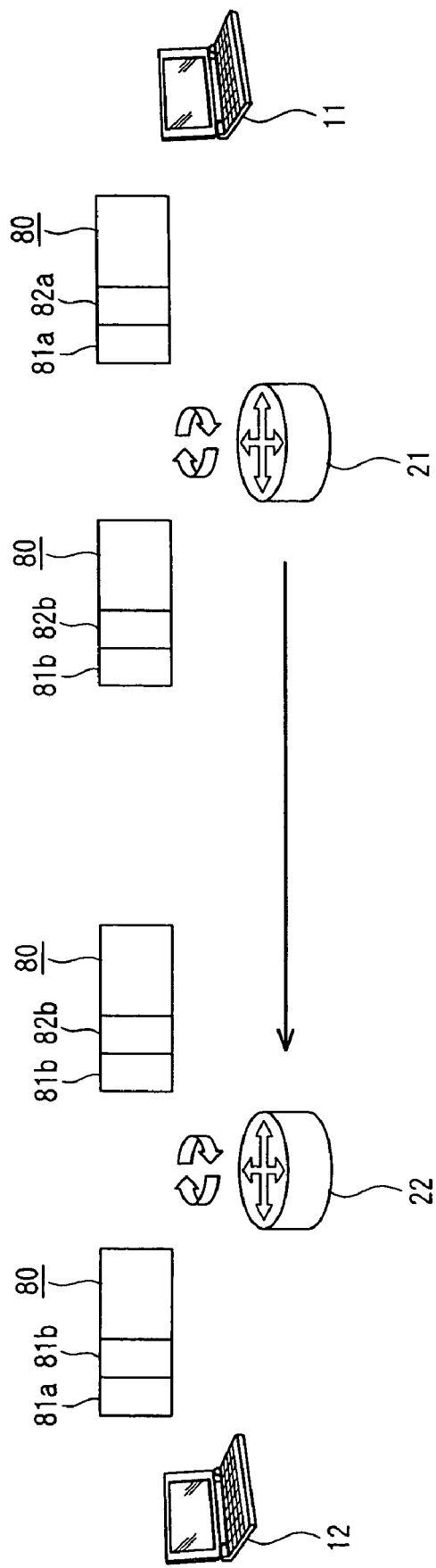
FIG. 11 shows the state of converting a packet format in the process of transferring a packet.

FIG. 11 shows the state in which the format of a packet is converted in the process of transferring the packet. In FIG. 11, when the source terminal 11 transfers the packet 80 to the destination terminal 12, the source terminal identification address 82a is set as a source address, and the destination terminal identification address 81a is set as a destination address. Upon receipt of the packet, the AR 21 determines whether or not address conversion is required, and issues an inquiry about the conversion information to the address management server when the address conversion is required. In this example, both source address and destination address require the address conversion.

When the access router 21 obtains address conversion information, it performs address conversion according to the information. After the conversion is performed, both the source address and the destination address can be processed as transfer addresses. That is, the packet 80 is transferred with the destination packet transfer address 81 band the source packet transfer address 82b set together.

When the access router 22 of the destination terminal receives the packet 80, it performs address conversion in the similar process as described above. Thus, the address is converted into the original address of the packet transmitted by the source terminal. That is, the address is converted into the source terminal identification address 82a and the destination terminal identification address 81a. The converted packet 80 is transferred to the destination terminal 12.

(Merit of Router Determining Whether or Not Address Conversion is Performed)

The address management server 40 (shown in FIG. 1) for managing address conversion information manages a network in which a transfer system through which no user packets pass is separated from a control system. The present invention can also be applied to an end-to-end management type network which has no address management server and inquires the access router to which the destination terminal is connected of the address conversion information about the communication partner.

Therefore, when a router does not perform the determination on whether or not address conversion is required, the address management server, the address identification information management server, address identification information management server, or the access router to which the destination terminal is connected are inquired whether or not address conversion is required, and if it is required, a request is issued to transmit the conversion information. Thus, an inquiry is issued relating to an address which normally requires no address conversion, thereby generating an unnecessary address conversion information inquiry message. As a result, there occurs the problem of the congestion in the network, and the increase in the process load of the address management server and the access router.

According to the present embodiment, the router determines whether or not address conversion is to be performed on the target address before transmitting a request to obtain address conversion information, and the address conversion is performed only on an address required to be converted. Therefore, the above-mentioned problems do not occur.

(Merit of Setting Address Identification Information Management Server in Network)

When an address identification information management server is provided in an address conversion network and an address assignment policy of each address conversion network is updated, and when a newly activated address conversion network is connected to an address conversion network including the address identification information management server, the network traffic can be reduced as compared with the case where address assignment rule information, etc. is individually announced to a router in all address conversion networks by switching the address assignment rule information etc. with the address identification information management server in the address conversion network. The network administrator can enter address assignment rule information only in the address identification information management server, and it is not necessary to notify all routers of the information. Therefore, an address conversion network can be more easily implemented than in the case in which a notification is required to be issued to all routers.

Variations of the above-mentioned embodiments are listed below.

(First Variation)

When the address conversion policy of a packet used in an address conversion network is unified, for example, when an administrator manages a unified address conversion policy in advance by converting a destination address and a source address in an address conversion network, an entry for uniquely retrieving a packet transfer address from a terminal identification address and an entry for uniquely retrieving a terminal identification address from a packet transfer address are written in an address conversion table so that they can be referred to. Thus, the address assignment rule information for identification of a terminal identification address and a packet transfer address is not required to be stored in the address identification information management server. In this case, it is not necessary to provide a terminal identification address/packet transfer address determination unit in the AR or the BR.

(Second Variation)

In the above-mentioned embodiments, it is assumed that a terminal identification address and a packet transfer address have the same format as the IPv6, but the present invention is not limited to this application. For example, the terminal identification address and the packet transfer address can be in the same format as the IPv4 address system.

(Third Variation)

The router provided in a network according to the above-mentioned embodiment is either an AR or a BR, but any other routers can be provided. For example, an anchor router (ANR) capable of preventing the minute operations of a communications terminal from being disclosed to a communication partner by having the function of converting an address as the AR can be provided in an address conversion network and by having classifically the function of converting an address in the network.

(Fourth Variation)

There can be an address conversion network without an address identification information management server (hereinafter referred to as an independent address conversion network). However, in this case, the network prefix information or address assignment rule information used in the address conversion network cannot be announced to other address conversion networks. Therefore, the source address of a packet received by the address conversion network from the source terminal of the independent address conversion network is mistakenly determined as an external IP network address.

Therefore, in the AR in the address conversion network to which a destination terminal is connected, no conversion is performed from a packet transfer address to a terminal identification address, and there occurs the problem that a packet is transferred to the destination terminal with the source address set as the packet transfer address. This problem can be solved as follows. That is, when a packet is transferred from an independent address conversion network to outside the network, the source address of a packet is converted from a packet transfer address into a terminal identification address, thereby solving the problem.

(Fifth Variation)

In the procedure of the address converting process of the AR and the BR, the prefix determination unit matches the network prefix information between the address prefix and the network prefix information in the address identification information table. If a matching result is obtained, the address assignment rule information retrieved from the corresponding network prefix information can be passed to the terminal identification address/packet transfer address determination unit. In this case, the terminal identification address/packet transfer address determination unit which receives the process from the prefix determination unit does not have to issue a request to retrieve address identification information to the table lookup unit.

(Sixth Variation)

In the address assignment rule information in the address identification information table, when a bit value specified by a determination bit is referred to, the address identification information table can store a packet transfer address determination bit value instead of a terminal identification address determination bit value as the information for identification of an address as a terminal identification address or a packet transfer address. However, when information is transmitted and updated between address identification information management servers, and when the determination bit values match each other, it is necessary to issue the information indicating the type of the address, that is, a terminal identification address or a packet transfer address.

(Seventh Variation)

The process flow in the block diagram of the function of the address conversion of an AR and a BR is not limited to the process flow shown in FIG. 5. For example, using the information used in FIG. 5, address conversion can be performed after determining whether address determination and address conversion are to be performed on a packet.

(Eighth Variation)

In the above-mentioned embodiments, it is not determined based on which policy address conversion is to be performed on each packet or network when there are a plurality of address conversion policies in an address conversion network. One of the solutions is a method of dynamically applying an address conversion policy by marking which address conversion is to be performed on each packet in the network, or the AR or the BR of the network determining from the application and the destination address, etc.

(Ninth Variation)

The function of determining an address conversion policy in the address conversion determination unit 39 (shown in FIG. 5) can be realized by another function block separated from the address conversion determination unit. When an address conversion policy is unified in advance, it is not necessary to have the function of determining an address conversion policy.

(Tenth Variation)

In a router, etc. forming a process function block in the direction of the flow of packets, by performing a specific process to the function block, it is not necessary to have the process flow which has been performed by the address conversion determination unit according to the information through which path a packet has been received. Furthermore, in a router, etc. forming a process function block for each address field of a packet, there is no necessity of process flow using the information about an address in which address field of a packet which has been performed by the address conversion determination unit.

(Eleventh Variation)

In the above-mentioned embodiments, only the function of realizing address conversion is described. However, when a packet transferred from the communications terminal in an address conversion network is transmitted with a terminal identification address, it can be recognized as an unauthorized packet, and can be discarded, etc. That is, a packet filtering capability can be added as necessary.

(Twelfth Variation)

In an address identification information update message for exchange of address identification information, when an address identification information management server transmits a message to an AR or a BR in an address conversion network, it can be distributed after assigning a multicast address to all ARs or BRs in advance. Thus, by transmitting the message to the multicast address, the number of address identification information update messages can be reduced.

(Thirteenth Variation)

In the above-mentioned embodiments, an address identification information management server is implemented, and address identification information for prescription of information such as address assignment, etc. is announced and updated through an address identification information management server in each necessary. However, each of the ARs and BRs in an address conversion network can also individually exchange information without implementing an address identification information management server.

CONCLUSION

In the present invention, an addresses represented in the same format are identified using a router. Therefore, the problems of an extra load on the address management server, a packet loss and an increasing delay of a packet transfer due to an unnecessary inquiry to the address management server can be reduced. Furthermore, address identification information can be managed in each network, and when address identification information is updated, the information can be exchanged with another address identification information management server, and announced to the router in the network, thereby reducing the cost of implementing each network address conversion network (setting address identification information to a router, etc.) and reducing the number of notification messages in the entire network.

As described above, the present invention has the effect of allowing a terminal in an address conversion network to communicate with an IP communications terminal in an external IP network (interconnection with an external IP network) by correctly discriminating an existing IP address, a terminal identification address, and a packet transfer address in a router such as an AR, a BR, etc.

Furthermore, when address conversion of a packet is performed as necessary, an unnecessary inquiry to an address management server can be reduced, and an assignment rule of a terminal identification address and a packet transfer address can be freely determined by an administrator of each network.

In addition there can be a plurality of address conversion policies in an address conversion network. For example, address conversion of a destination address and source address of a packet is performed on a packet in an address conversion network, but when an interconnection with an external IP network is made, an address conversion policy that source address is not converted can be allowed.

Additionally instead of each router individually issuing a notification, an address identification information management server issues a notification, thereby reducing a total number of notifications issued in the entire network.

What is claimed is:

1. A router physically connected in a communications system for relaying a received packet including an address, the router comprising:
   a determination unit for determining which one of following address types the address added to the received packet belongs to: a terminal identification address for identification of a source terminal and a destination terminal performing communications through the router; a packet transfer address for transfer of a packet to another router; and an address requiring no address conversion, the terminal identification address, the packet transfer address, and the address requiring no address conversion being represented in a same format;
   an address conversion unit for converting the address, in response to the terminal identification address and/or the packet transfer address from the determination unit; and
   an address identification information table storing address identification information;
   wherein the determination unit determines an address type of the received packet according to the address identification information.

2. The router according to claim 1, wherein:
   said address identification information stored in said address identification information table includes network prefix information indicating a network prefix assigned by an Internet administrator, and address assignment rule information used when the address is assigned; and
   said address identification information is externally updated.

3. The router according to claim 1, wherein:
   said address identification information comprises network prefix information indicating a network prefix assigned by an Internet administrator; and
   said determination unit determines, according to the network prefix information, whether an address added to a packet is one of a terminal identification address and a packet transfer address to be added to a packet used in an address conversion network in which a terminal identification address and a packet transfer address are used, or an IP address for use in an external IP network.

4. The router according to claim 3, further comprising:
   an address conversion information storage table for storing address conversion information, wherein:
   said address conversion unit converts the address based on the address conversion information; and
   said address conversion information stored in said address conversion information storage table is externally updated.

5. An address identification information management server physically connected in a communications system for managing address identification information for identification of an address type in a first network in which a first apparatus to which the server is applied is accommodated, comprising:
   a notification unit for notifying a second apparatus in a second network of address identification information managed by the first apparatus at least one of cases when the first network is connected to the second network and when contents of the address identification information managed by the first apparatus are updated; and
   a reception unit for receiving the address identification information notified by the second apparatus in the second network,
   wherein said address identification information managed by the first apparatus is updated depending on contents received by said reception unit.

* * * * *